United States Patent
Malczewski

[11] Patent Number: 5,908,994
[45] Date of Patent: Jun. 1, 1999

[54] TRAM MONITOR

[76] Inventor: Edmund A. Malczewski, 2514A N. Weil St., Milwaukee, Wis. 53212

[21] Appl. No.: 08/975,476

[22] Filed: Nov. 20, 1997

[51] Int. Cl.[6] .................................................. G01M 19/00
[52] U.S. Cl. ............................................ 73/865.8; 33/700
[58] Field of Search ........................... 73/865.8; 33/700, 33/712, 710

[56] References Cited

U.S. PATENT DOCUMENTS

| | | | |
|---|---|---|---|
| 2,124,006 | 7/1938 | Parker | 248/124 |
| 4,413,422 | 11/1983 | Kitamura | 33/185 |
| 5,465,798 | 11/1995 | Edlmund et al. | 73/152.43 |
| 5,758,558 | 6/1998 | Squires | 33/712 |
| 5,808,740 | 9/1998 | Tanaka et al. | 356/358 |

*Primary Examiner*—Max H. Noori
*Attorney, Agent, or Firm*—Donald J. Ersler

[57] ABSTRACT

A tram monitor includes an x-axis arm, a y-axis arm, and a mounting base. The mounting base includes a mounting pedestal which is rigidly fastened to the mounting block. The x-axis arm includes an x-axis indicator, an x-axis indicator tube, an axial tube, a junction clamp, and an x-axis indicator clamp. The axial tube is firmly retained by the mounting pedestal at one end through the x-axis indicator clamp and the junction clamp on the other end. The x-axis indicator is fastened to the x-axis indicator tube on one end and to the junction clamp on the other. The y-axis arm includes a y-axis indicator, a y-axis indicator tube, and, a y-axis indicator clamp. The y-axis indicator tube is firmly retained by the mounting pedestal on one end through the y-axis indicator clamp and the y-axis indicator is fastened to the other end of the y-axis indicator tube. The mounting block is fastened to the ram of a milling machine. The x-axis indicator and y-axis indicator are placed in contact with the milling head of a milling machine and show when the milling head is out of tram.

7 Claims, 5 Drawing Sheets

TRAM MONITOR

BACKGROUND OF THE INVENTION

1. Field of the Invention

The present invention relates generally to precision measuring devices and more specifically to a tram monitor which indicates when a milling head of a milling machine is out of tram.

2. Discussion of the Prior Art

Milling machines have milling heads which may be rotated about the x and y axes. This flexibility allows the milling cutter to make milling passes at different angles. Unfortunately, even though the milling head may be tightened down, it still may work its way out of the angled positioned it was set to, thus becoming out of tram. Presently, a milling head is put into tram by positioning a dial indicator on the milling head spindle and rotating the spindle. The drawback to this process is the amount of work required to check tram during machining; the operator must remove the item being machined and set up the dial indicator again, a time consuming process.

Accordingly, there is a clearly felt need in the art for a tram monitor which provides a continuous indication of whether a milling head is in tram without inconveniencing a milling machine operator with time consuming spot checks.

SUMMARY OF THE INVENTION

The primary objective of the present invention is to provide a tram monitor which provides a continuous indication of whether a milling head is in tram without inconveniencing a milling machine operator with time consuming spot checks.

According to the present invention, a tram monitor includes an x-axis arm, a y-axis arm, and a mounting base. The mounting base includes a mounting block and a mounting pedestal. The mounting pedestal is rigidly fastened to the mounting block. The mounting block has a bolt hole which is sized to receive a bolt the same size as a lifting eye bolt tap.

The x-axis arm includes an x-axis indicator, an x-axis indicator tube, an axial tube, a junction clamp, and an x-axis indicator clamp. The x-axis indicator clamp is rigidly fastened to the pedestal. The axial tube is firmly retained by tightening a handle on the x-axis indicator clamp on one end of the axial tube. The junction clamp is tightened on the other end of the axial tube. The x-axis indicator tube is axially adjustable inside a bore in the junction clamp. The x-axis indicator tube is firmly retained by tightening a handle on the junction clamp on one end of the x-axis indicator tube and the x-axis indicator is fastened to the other end of the x-axis indicator tube.

The y-axis arm includes a y-axis indicator, a y-axis indicator tube, and, a y-axis indicator clamp. The y-axis indicator clamp is rigidly fastened to the pedestal. The y-axis indicator tube is firmly retained by tightening a handle on the y-axis indicator clamp on one end of the y-axis indicator tube and the y-axis indicator is fastened to the other end of the y-axis indicator tube.

Installation of the tram monitor is quick and uncomplicated. The mounting block is fastened to the milling machine with a bolt which is inserted through the bolt hole in the mounting block and tightened in an eye bolt lifting tap in the milling machine ram. The x-axis arm and y-axis arm are manipulated until the x and y axes indicators contact the milling head of the milling machine. The x and y axes indicators are then zeroed. If the milling head goes out of tram in x or y axes, either or both of the indicators will show a non-zero measurement.

Accordingly, it is an object of the present invention to provide a tram monitor which continuously monitors the tram of a milling head.

It is a further object of the present invention to provide a tram monitor which only has to be set up once to monitor the tram of a milling head.

Finally, it is another object of the present invention to provide a tram monitor which can be viewed at any time to determine whether a milling head is in tram.

These and additional objects, advantages, features and benefits of the present invention will become apparent from the following specification.

DETAILED DESCRIPTION OF THE PREFERRED EMBODIMENTS

Figure 1:
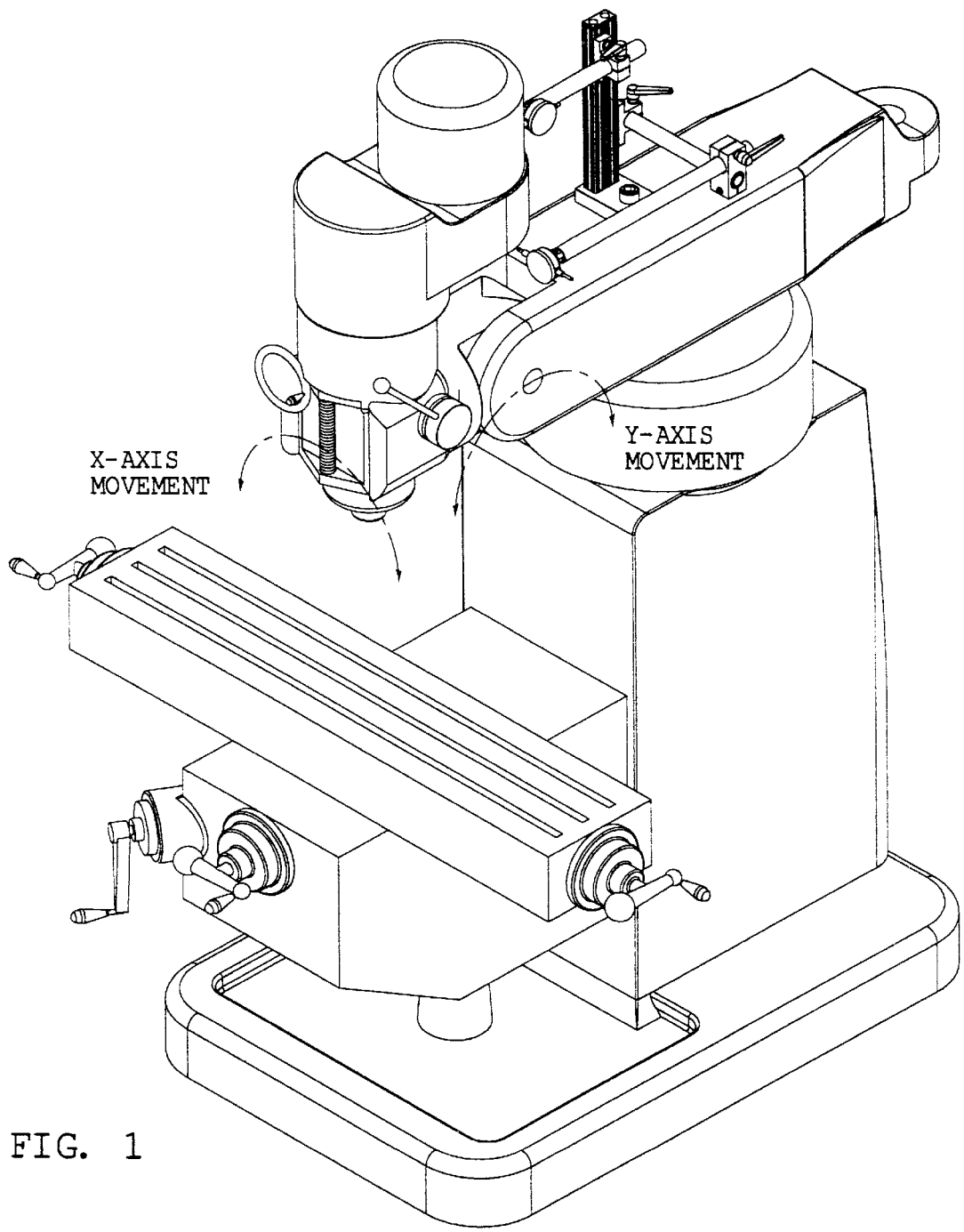
FIG. 1 is a perspective view of a milling machine with a tram monitor fastened thereto in accordance with the present invention.
Figure 2:
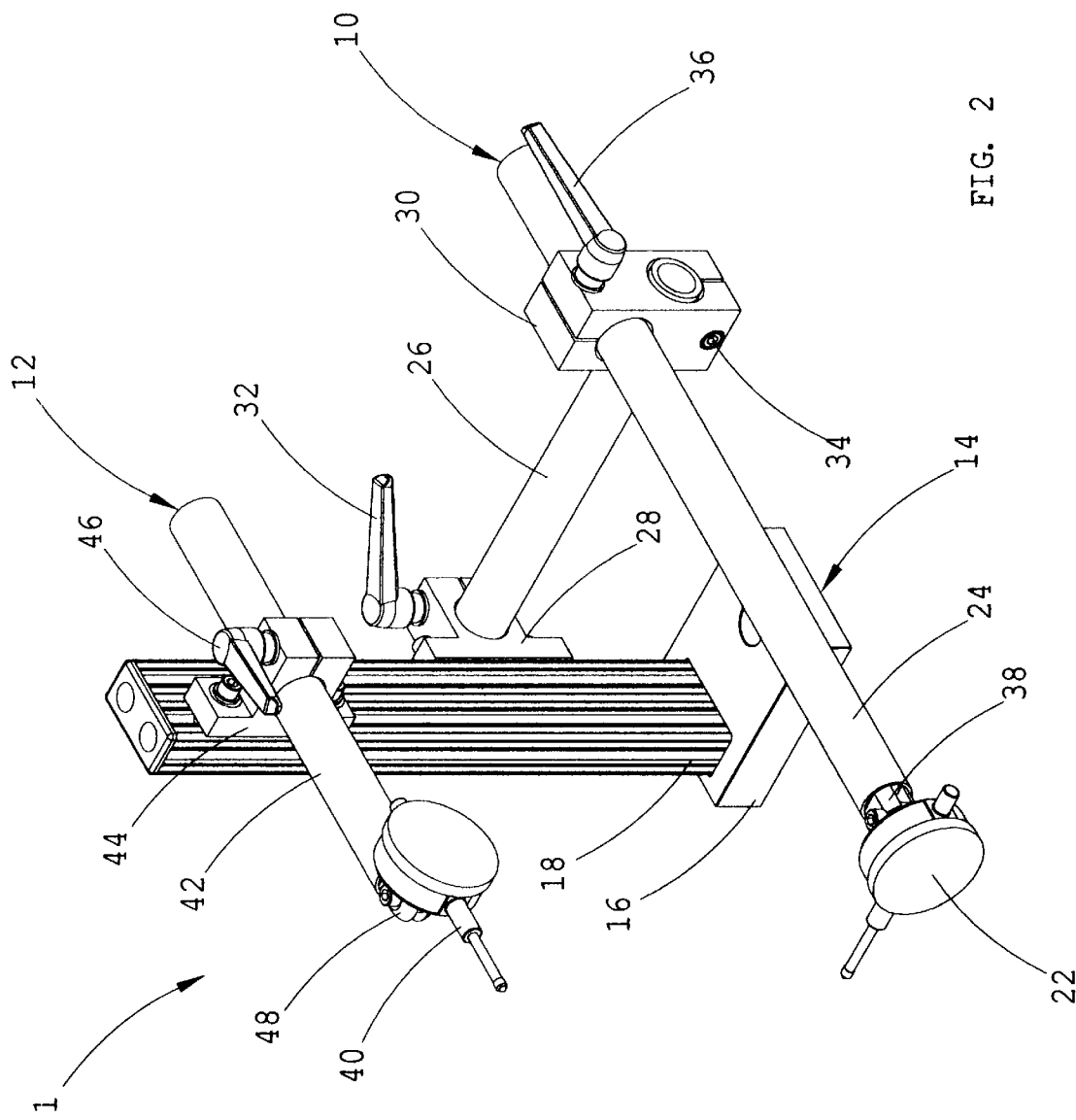
FIG. 2 is a perspective view of the tram monitor in accordance with the present invention.
Figure 3:
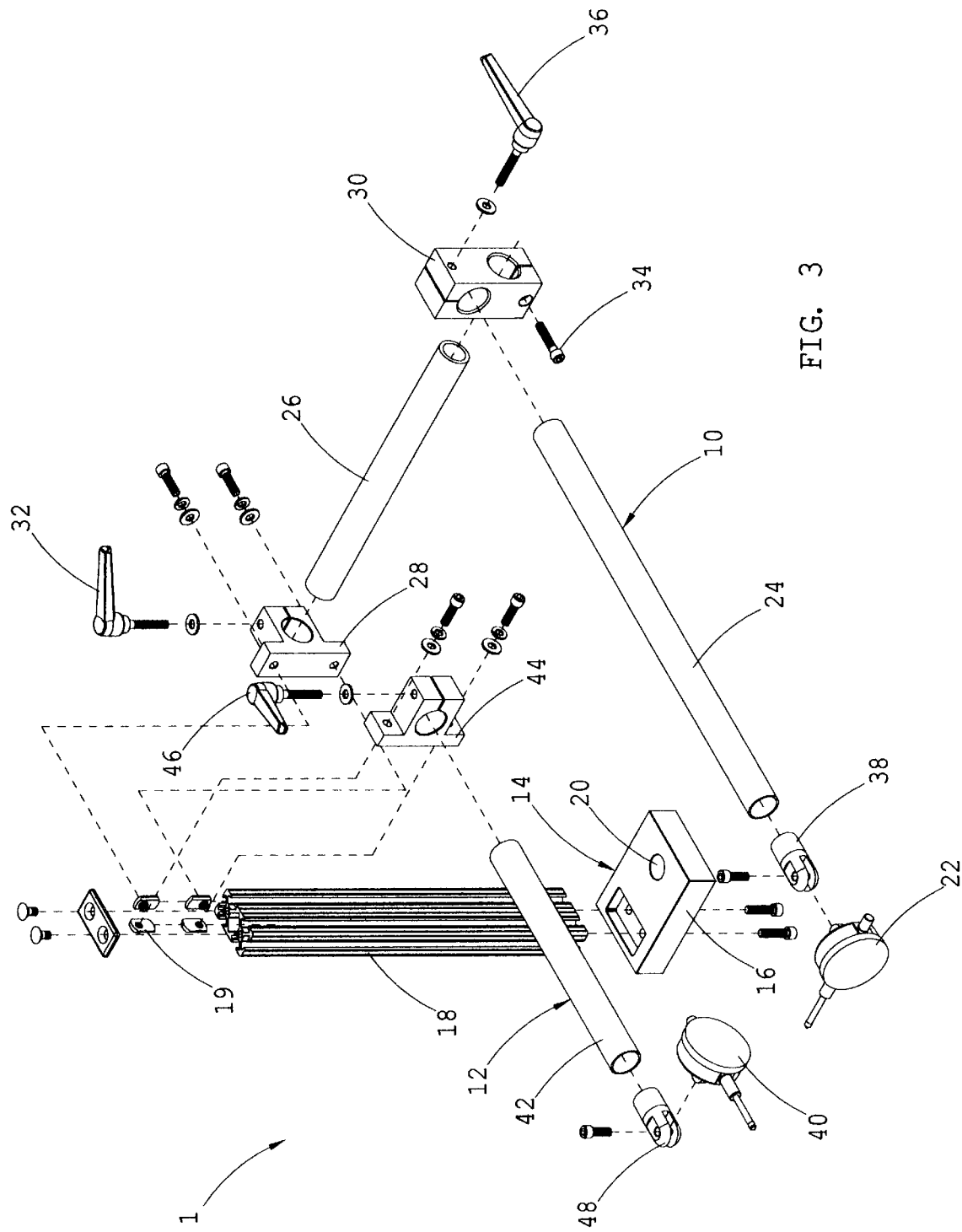
FIG. 3 is a perspective exploded view of the tram monitor in accordance with the present invention.

With reference now to the drawings, and particularly to FIG. 2, there is shown a perspective view of a tram monitor 1. With reference to FIGS. 1 and 3, the tram monitor includes an x-axis arm 10, a y-axis arm 12, and a mounting base 14. The mounting base 14 includes a mounting block 16 and a mounting pedestal 18. The mounting pedestal 18 is preferably fastened to the mounting block 16 by machining a pocket in the mounting block 16 and bolting the mounting pedestal 18 thereto. The mounting block has a bolt hole 20 which accommodates a bolt which is threaded into an eye bolt lifting tap in a ram of a milling machine. The mounting pedestal 18 is preferably an aluminum extrusion having a plurality of T-slots in the cross-section for retaining at least one sliding nut 19 in each T-slot.

The x-axis arm 10 includes an x-axis indicator 22, an x-axis indicator tube 24, an axial tube 26, an x-axis indicator clamp 28, and a junction clamp 30. The x-axis indicator clamp 28 is rigidly fastened to a first side of the mounting pedestal 18 with at least one bolt and sliding nut 19 which are retained within a T-slot in mounting pedestal 18. The x-axis indicator clamp 28 is slidably adjustable along the length of the mounting pedestal 18. The axial tube 26 is axially adjustable inside a bore in the x-axis indicator clamp 28 and may be firmly retained therein by tightening a handle 32 on one end of the axial tube 26. The junction clamp 30 is preferably tightened on the other end of the axial tube 26 by a cap screw 34. The x-axis indicator tube 24 is axially adjustable inside a bore in the junction clamp 30. The axial tube 26 is firmly held preferably perpendicular to the x-axis indicator tube 24 in the junction clamp 30. The x-axis indicator tube 24 is firmly retained by tightening a handle 36 on the junction clamp 30 on one end of the x-axis indicator tube 24. A back of the x-axis indicator 22 is fastened to an x-axis interface 38 with a bolt. The x-axis interface 38 is preferably fastened to the x-axis indicator tube 24 by press fitting.

The y-axis arm 12 includes a y-axis indicator 40, a y-axis indicator tube 42, and, a y-axis indicator clamp 44. The y-axis indicator clamp 44 is rigidly fastened to a second side of the mounting pedestal 18 with at least one bolt and sliding nut 19 which are retained within a T-slot of the mounting pedestal 18. The x-axis indicator clamp 28 is slidably adjustable along the length of the mounting pedestal 18. The second side is preferably perpendicular to the first side of the mounting pedestal 18. The y-axis indicator tube 42 is firmly retained in the y-axis indicator clamp 44 by tightening a handle 46 on one end of the y-axis indicator tube 42. A back of the y-axis indicator 40 is fastened to a y-axis interface 48 with a bolt. The y-axis indicator tube 42 is axially adjustable inside a bore in the y-axis indicator clamp 44. The y-axis interface 48 is preferably fastened to the y-axis indicator tube 42 by press fitting.

The x-axis indicator 22 and y-axis indicator 40 are not to be limited to dial indicators or indicators having digital readout, but any measuring device which will indicate that a distance has been traveled by the milling head.

Figure 4A:
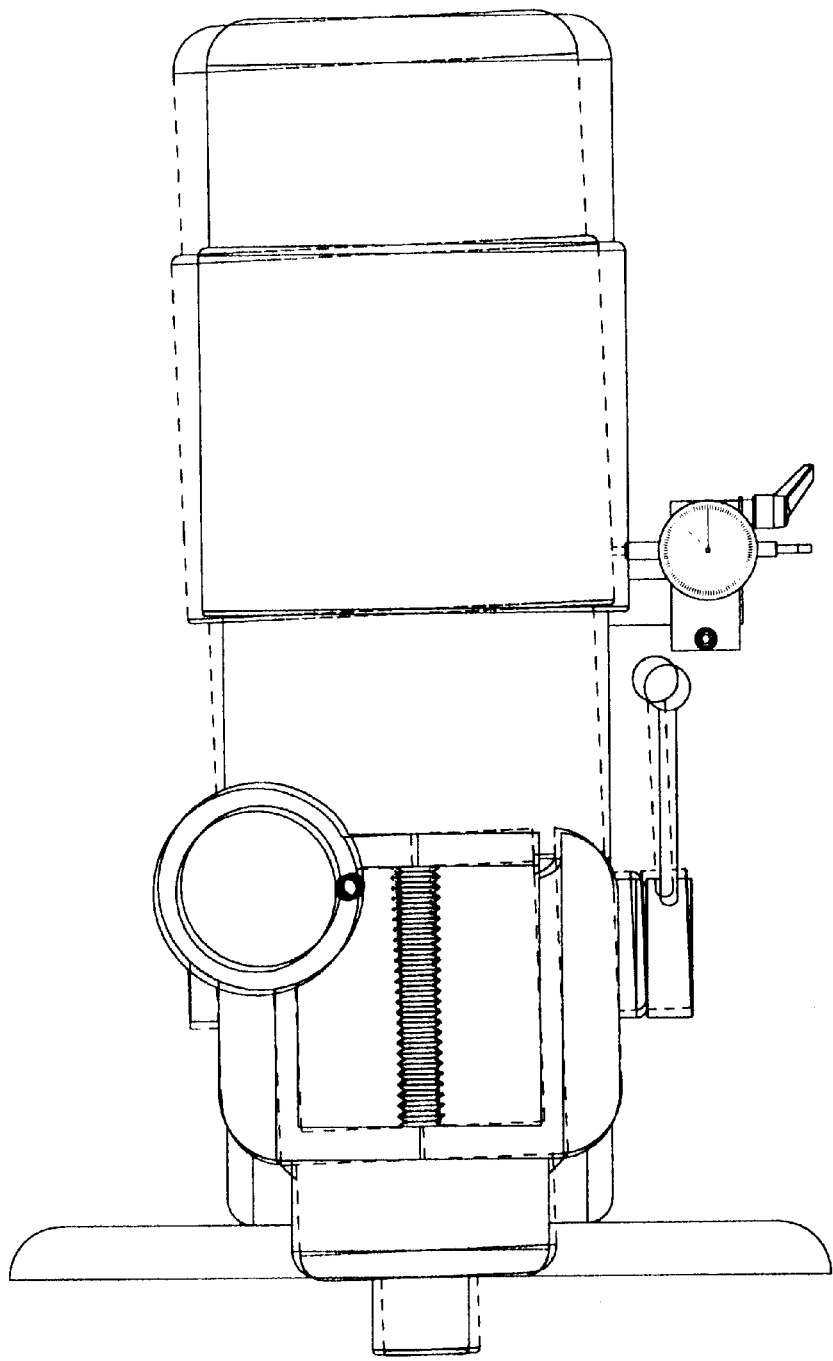
FIG. 4a is a front view of a tram monitor measuring the tram of a milling head in accordance with the present invention.
Figure 4B:
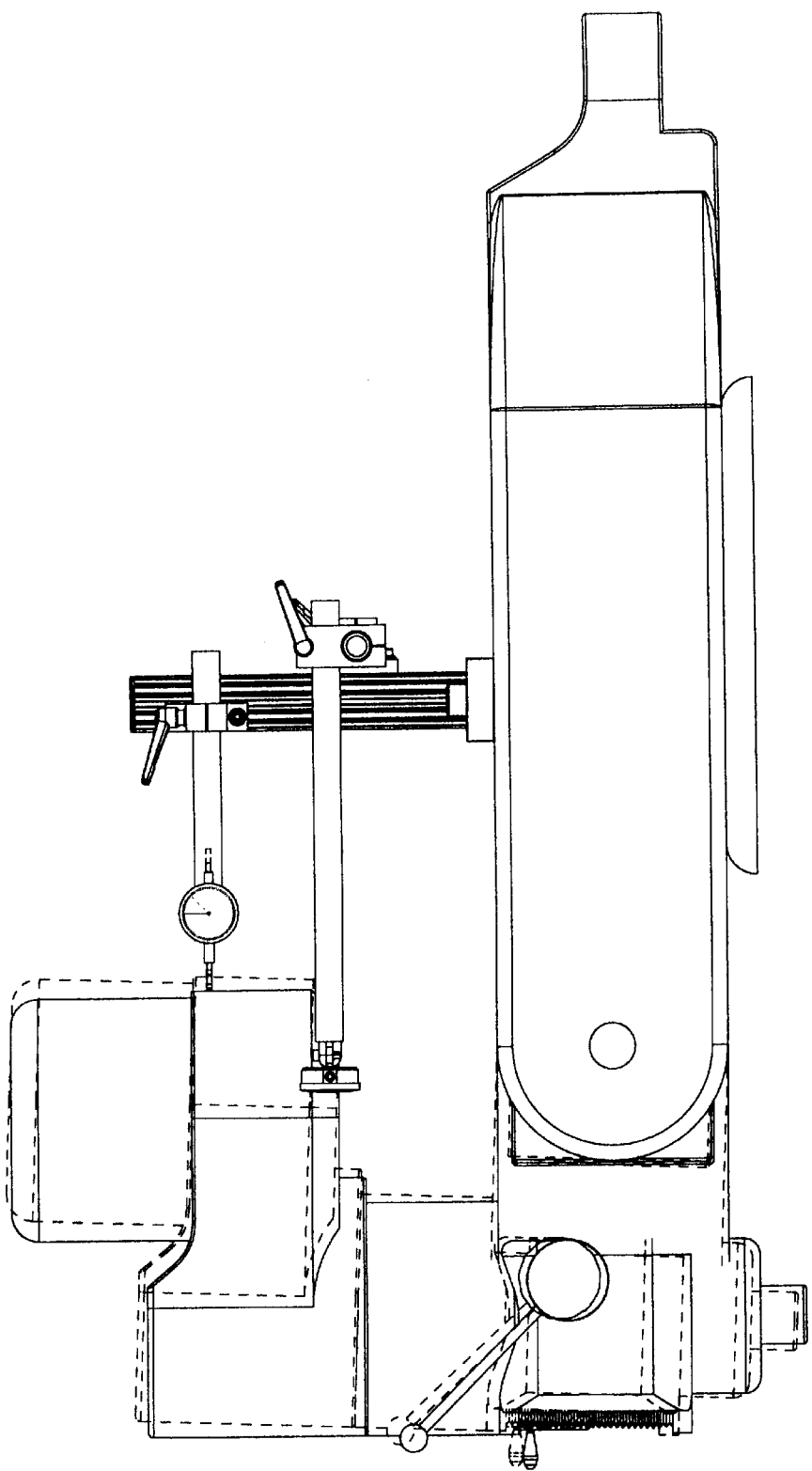
FIG. 4b is a side view of a tram monitor measuring the tram of a milling head in accordance with the present invention.

The axial tube 26 is included with the x-axis arm 10 to accommodate the use of the tram monitor 1 when the y-axis arm indicates on a surface of a milling head which has a different distance to center then the x-axis arm as shown in FIGS. 4*a* & 4*b*.

Installation and use of the tram monitor is quick and uncomplicated. Each milling machine usually has a ram with at least one eye bolt tap. The x-axis arms and the y-axis arms are retracted and a bolt is placed through the bolt hole 20 of the mounting base 14 into the eye lifting bolt tap and tightened down. The y-axis indicator tube 42 is extended until the y-axis indicator 40 contacts the milling head. The x-axis indicator tube 24 and axial tube 26 are extended until the x-axis indicator 22 contacts the milling head. After tramming in the milling head, the x and y axes indicators are then zeroed. When the milling head goes out of tram in either the x-axis or y-axis, the indicators will show a reading which is not zero as illustrated in FIGS. 4*a* & 4*b*. Whether the milling head should be re-tramed is dependent upon the precision of the work being done.

It is also be possible to replace the indicators with limit switches, or use the limit switches in combination with the indicators. The advantage to using a limit switch in combination with the indicators is that the indicators would not have to be visually checked to see if the milling head was still in tram. The limit switches could be set to a particular distance and when that distance is traveled, an audible alarm or a flashing light would be tripped. The indicators would show where to tram the milling head.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The tram monitor should not be limited to monitoring only milling heads of milling machines, but can be used for any purpose where precision measurement is needed. In some applications, the x-axis arm could be identical to the y-axis arm.

I claim:

1. A tram monitor for monitoring the position of a milling head relative to a table of a milling machine comprising:

a mounting block being attachable to the milling machine adjacent the milling head;

a mounting pedestal being attached substantially perpendicular to said mounting block;

an x-axis indicator clamp being attachable along the length of said mounting pedestal on a first side thereof;

an x-axis indicator with a dial or digital display being attached to an x-axis indicator tube;

a junction clamp having an axial bore and an x-axis bore, said axial bore being sized to slidably receive an axial tube, said x-axis bore being sized to slidably receive said x-axis indicator tube, said x-axis bore being substantially perpendicular to said axial bore;

a y-axis clamp being attachable along the length of said mounting pedestal on a second side thereof; and a y-axis indicator with a dial or digital display being attached to a y-axis indicator tube, said y-axis indicator tube being slidably received by a bore in said y-axis clamp.

2. The tram monitor for monitoring the position of a milling head relative to a table of a milling machine of claim 1, further comprising:

said x-axis indicator clamp being attached to said first side of said mounting pedestal with at least one bolt and sliding nut, said sliding nut being slidable over the length of said mounting pedestal; and said y-axis indicator clamp being attached to said second side of said mounting pedestal with at least one bolt and sliding nut, said sliding nut being slidable over the length of said mounting pedestal.

3. A tram monitor for monitoring the position of a milling head relative to a table of a milling machine comprising:

a mounting pedestal being attachable to the milling machine adjacent the milling head;

an x-axis indicator clamp being attachable along the length of said mounting pedestal;

an x-axis arm being sized to be slidably received by a bore in said x-axis indicator clamp;

a y-axis indicator clamp being attachable along the length of said mounting pedestal;

a y-axis arm being sized to be slidably received by a bore in said y-axis indicator clamp; and at least two indicators each having a dial or digital display, a first indicator being mounted to an end of said x-axis arm, a second indicator being mounted to an end of said y-axis arm.

4. The tram monitor for monitoring the position of a milling head relative to a table of a milling machine of claim 3, further comprising:

said mounting pedestal having a mounting block attached to a bottom thereof, said mounting block having a bolt hole formed therethrough.

5. The tram monitor for monitoring the position of a milling head relative to a table of a milling machine of claim 3, wherein:

said x-axis indicator clamp being attached to said first side of said mounting pedestal with at least one bolt and sliding nut, said sliding nut being slidable over the length of said mounting pedestal; and said y-axis indicator clamp being attached to said second side of said mounting pedestal with at least one bolt and sliding nut, said sliding nut being slidable over the length of said mounting pedestal.

6. The tram monitor for monitoring the position of a milling head relative to a table of a milling machine of claim 3, further comprising:

said y-axis arm being a y-axis indicator tube, said y-axis indicator tube being axially adjustable inside said y-axis indicator clamp.

7. A tram monitor for monitoring the position of a milling head relative to a table of a milling machine of claim 3, further comprising:

said x-axis arm comprising an x-axis indicator tube, a junction clamp, and an axial tube, said axial tube being axially adjustable in said x-axis indicator clamp at one end, said axial tube being firmly retained in said junction clamp at the other end, said x-axis indicator tube being axially adjustable in said junction clamp.

* * * * *